United States Patent [19]

Rühl et al.

[11] Patent Number: 4,473,606

[45] Date of Patent: Sep. 25, 1984

[54] FOILS

[75] Inventors: Karl Rühl, Bad Nauheim; Karlheinz Bildner, Rodenbach, both of Fed. Rep. of Germany

[73] Assignee: Rutgerswerke Aktiengesellschaft, Frankfurt am Main, Fed. Rep. of Germany

[21] Appl. No.: 420,793

[22] Filed: Sep. 21, 1982

[30] Foreign Application Priority Data

Oct. 20, 1981 [DE] Fed. Rep. of Germany ....... 3141539

[51] Int. Cl.³ .................. B32B 11/02; B32B 3/10
[52] U.S. Cl. .................. 428/40; 106/14.34; 428/131; 428/137; 428/220; 428/489; 428/497; 428/521; 524/68
[58] Field of Search .............. 428/131, 137, 220, 489, 428/497, 521, 40; 106/14.34, 14.39; 524/68

[56] References Cited

U.S. PATENT DOCUMENTS 4,282,127 8/1981 Desgouilles .................. 524/68

FOREIGN PATENT DOCUMENTS 2041951 9/1980 United Kingdom .................. 524/68

Primary Examiner—Paul J. Thibodeau
Attorney, Agent, or Firm—Hammond & Littell, Weissenberger and Muserlian

[57] ABSTRACT

An anticorrosion perforated foil for fusion onto metal substrates comprising 60 to 90% by weight of bitumen, 0.5 to 7% by weight of styrene-butadiene rubber, 5 to 25% by weight of a bitumen modified with polymers, 0.5 to 7.5% by weight of natural resin and 0.5 to 10% by weight of organic and/or inorganic fibers stable at above 160° C. and its preparation and a method of protecting metal elements from corrosion.

5 Claims, 1 Drawing Figure

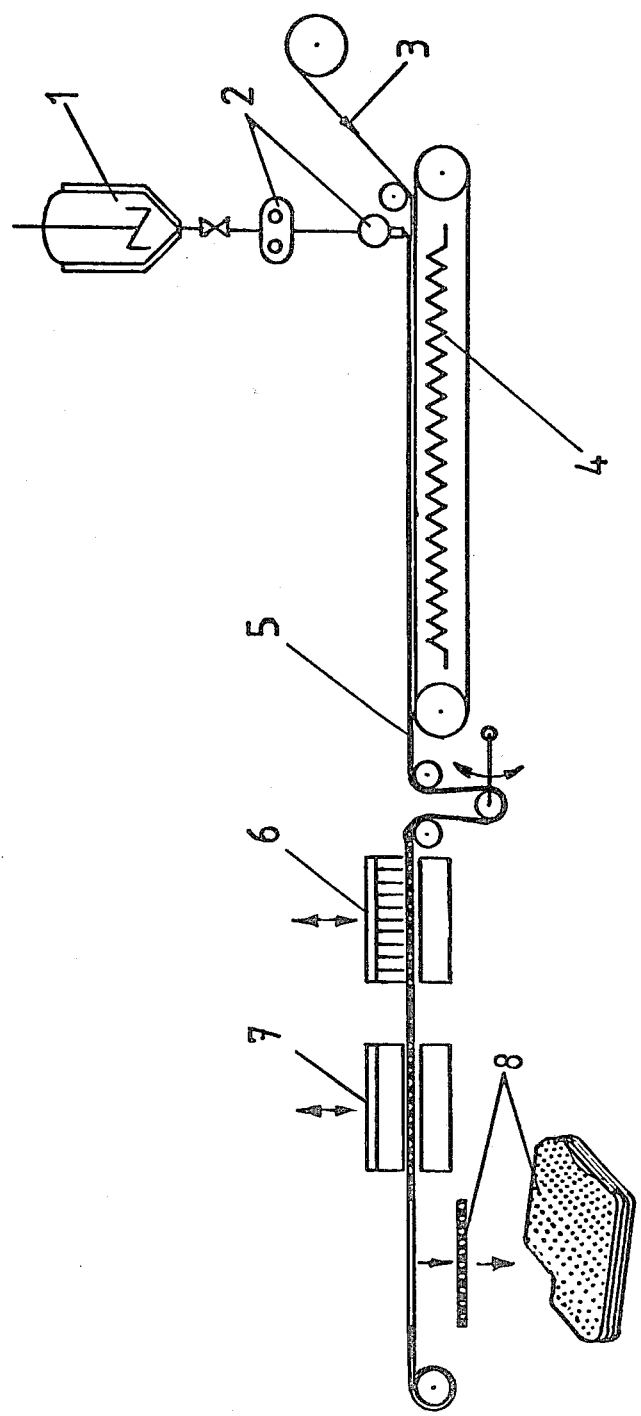

FOILS

STATE OF THE ART

Motor vehicle elements such as the bottom plates and undersides of automobile hoods are usually coated with heavy bituminous-based foils which sound-proof the vehicle and provide protection of the metal parts from corrosion. The metal elements are usually coated by placing a bitumen-containing foil thereon and softening the foil by heating to about 120° C. whereby the foil conforms to the shape of the metal element and becomes bonded thereto. However, the bituminous-containing foils have the disadvantage of being very heavy, usually on the order of 3 to 4 kg per square meter.

Because of energy saving measures, new and lighter and more effective noise suppression and corrosion resistant coatings have been developed but in many instances not all the metal parts are completely covered with the said foils and the metal plates are not adequately protected from corrosion.

OBJECTS OF THE INVENTION

It is an object of the invention to provide a lightweight, anticorrosion foil and its preparation.

It is another object of the invention to provide a novel method of protecting metal substrates from corrosion and the articles produced thereby.

These and other objects and advantages of the invention will become obvious from the following detailed description.

THE INVENTION

The anticorrosion foils of the invention for fusion onto metal substrates are comprised of a perforated foil made of a composition of 60 to 90% by weight of bitumen, 0.5 to 7% by weight of styrene-butadiene rubber, 5 to 25% by weight of a bitumen modified with polymers, 0.5 to 7.5% by weight of natural resin and 0.5 to 10% by weight of organic and/or inorganic fibers stable at above 160° C. Preferably, the foil of the invention has a density of 1000 to 1100 kg per cubic meter and a thickness of 0.8 to 1.5 mm.

The novel method of the invention for protecting metal substrates from corrosion comprises applying a perforated foil made of a composition of 60 to 90% by weight of bitumen, 0.5 to 7% by weight of styrene-butadiene rubber, 5 to 25% by weight of a bitumen modified with polymers, 0.5 to 7.5% by weight of natural resin and 0.5 to 10% by weight of organic and/or inorganic fibers stable at above 160° C. to the entire surface of a metal substrate and heating the foil to 100 to 150° C. for a period of time sufficient to bond the foil to the substrate or approximately 30 minutes. Preferably, the foil has on one side thereof a separating layer. The resulting coated article has a thermal stability of at least 160° C. and a cold resistance of at least −40° C. and the metal is effectively protected against corrosion.

The novel method of the invention for preparing an anticorrosion foil comprises homogenizing a mixture comprised of 60 to 90% by weight of bitumen, 0.5 to 7% by weight of styrene-butadiene rubber, 5 to 25% by weight of a bitumen modified with polymers, 0.5 to 7.5% by weight of natural resin and 0.5 to 10% by weight of organic and/or inorganic fibers stable at above 160° C. at 180° to 220° C. and blending the fibers therein, placing the resulting mixture on a cooling surface covered with a separating foil, removing the cooled foil and separating foil from the surface perforating the foil and cutting the same to size.

It has been found that if the foil is perforated with holes of a diameter of approximately 1.2 mm at intervals of 5 to 100 mm, blister formation is avoided when the foil is fused to the metal substrate and after the included gas escapes during the fusion, the perforations are completely filled by the plastic material whereby the metal substrate is completely protected against corrosion.

The modified bitumen contains up to 30% by weight of polymer, preferably 5 to 30% by weight of the primary bitumen. Examples of suitable primary bitumens are Bitumen B 80 which has a needle penetration of 70 to 100 at 25° C. in 0.1 mm and a softening point of 44°–49° C. in the ring and ball test and Bitumen B 200 which has a needle penetration of 160–210 at 25° C. in 0.1 mm and a softening point of 37°–44° C. in the ring and ball test.

Examples of suitable polymer modifiers are polyisobutene, polybutene, polyethylene, atatic polypropylene, sytrene-butadiene rubbers and SBS rubbers.

Examples of suitable organic and/or inorganic fibers stable above 160° C. are polyesters fibers with a length less than 3 mm and mineral fibers such as glass or rock fibers.

The length of the fibers preferably varies between 1 to 3 mm.

Examples of the natural resins are Chinese balsam resin, rosin of pine roots and woodrosin of different origin.

During the formation of the foil on the cooling band, it is preferred to cover the cooling band with an easily separable paper such as silicon paper which adheres to the foil. The said paper makes it easier to handle the foil and prevents the foil from sticking to the pressure applying means when the foil is pressed onto the metal or steel substrate. The paper is preferably removed before the foil and the metal substrate are heated.

Referring to the drawing:

The FIGURE schematically illustrates the process for the production of the anticorrosion foil.

In the process, the components of the foil are melted and homogenously blended in a heated mixing means 1 and the resulting pastry mixture is applied by a distributing means 2 such as a gear pump provided with a wide slot nozzle onto a water-cooled steel strip 4 covered with a silicon paper separating foil 3. The cooled foil 5 consisting of the mixture of components and paper 3 is pulled from the steel strip 4 and is perforated by punch means 6 and then cut by die 7 into the desired size 8 of foil with the silicon paper 3 on one side thereof.

In the following examples there are described several preferred embodiments to illustrate the invention. However, it is to be understood that the invention is not intended to be limited to the specific embodiments.

EXAMPLE 1

A mixture of 74 parts by weight of molten bitumen B 80/25 was homogenized in a kneader at 180° C. with 3 parts by weight of styrene-butadiene rubber, 15 parts by weight of bitumen modified with EPDM, 3 parts by weight of Chinese Balsam resin and 5 parts by weight of shredded polyester fibers with a length of <3 mm and the resulting mixture was applied by a pump through a wide-slot nozzle onto a silicon-paper covered cooling band in a thickness of 0.8 mm. The foil and silicon paper were cooled and were separated from the cooling band and was perforated with holes of 1.2 mm at intervals of 10 mm and cut to the desired size.

The foil was placed on a beaded metal substrate with the silicone paper on the top and was lightly pressed against the metal. The silicon paper was peeled off and the coated metal substrate was heated at 120° C. for 30 minutes after which the foil was firmly attached to the entire surface of the metal substrate and the perforations had disappeared.

In the salt spray test of DIN 50021, the edges of coated plate showed no infiltrated rust which shows the anticorrosion protection. The resistance to cold test where a ball weighing 500 g was dropped from a height of 25 mm onto the uncoated side of the metal substrate at −40° C. showed no spalling of the foil from the metal substrates. The thermal stability was determined by heating the coated plate in a horizontal position at 160° C. for 30 minutes and the foil did not run off the raised beads of the substrate and showed no cracks, scratches or blisters.

EXAMPLE 2

A mixture of 80 parts by weight of molten bitumen B 100/25, 2 parts by weight of styrene-butadiene rubber, 12 parts by weight of bitumen modified with EPDM, 2 parts by weight of chinese balsam resin and 4 parts by weight of a shredded mineral fiber consisting of 45% of $SiO_2$, 20% by CaO, 15% of MgO, 12% of $Al_2O_3$, 3% of NaO and 5% of Fe was blended in an agitator at 220° C. and the homogenous mixture was poured from a vessel with a slot-type opening onto a silicone paper covered cooling band as in Example 1 with a thickness of 1.5 mm. The foil was processed and tested as in Example 1 and no defects occurred in any of the tests.

Various modifications of the products and methods of the invention may be made without departing from the spirit or scope thereof and it is to be understood that the invention is intended to be limited only as defined in the appended claims.

What we claim is:

1. An anticorrosion perforated foil comprising a mixture of 60 to 90% by weight of bitumen, 0.5 to 7% by weight of styrene-butandiene rubber, 5 to 25% by weight of a bitumen modified with polymers, 0.5 to 7.5% by weight of natural resin and 0.5 to 10% by weight of fibers which are stable at 160° C., said fibers being selected form the group consisting of organic fibers, inorganic fibers and mixtures thereof.

2. The foil of claim 1 wherein the perforations have diameters of 1 to 1.5 mm at intervals of 5 to 100 mm.

3. The foil of claim 1 or 2 wherein its density is 1000 to 1100 kg/m$^3$ and its thickness is 0.8 to 1.5 mm.

4. The foil of claim 2 wherein the perforations have diameters of about 1.2 mm.

5. The foil of claim 1 or 2 having on one side thereof a separating layer.

* * * * *